A. M. SHAUL.
INCUBATOR.
APPLICATION FILED JUNE 8, 1907.

935,697.

Patented Oct. 5, 1909.

Witnesses
F. L. Ourand
Vernon E. Hodges

Inventor
Albert M. Shaul
By Addison G. DuBois
his Attorney

UNITED STATES PATENT OFFICE.

ALBERT M. SHAUL, OF MERIDIAN, IDAHO.

INCUBATOR.

935,697.   Specification of Letters Patent.   Patented Oct. 5, 1909.

Application filed June 8, 1907. Serial No. 377,978.

*To all whom it may concern:*

Be it known that I, ALBERT M. SHAUL, a citizen of the United States, and resident of Meridian, in the county of Ada and State of Idaho, have invented a certain new and useful Improvement in Incubators, of which the following is a description.

My invention relates to an improvement in incubators, and the object is to provide means whereby heat can be retained within the incubator and thereby keep the eggs at a uniform temperature.

The invention relates to certain novel features of construction and combinations of parts which will be hereinafter described and pointed out in the claims.

Figure 1:
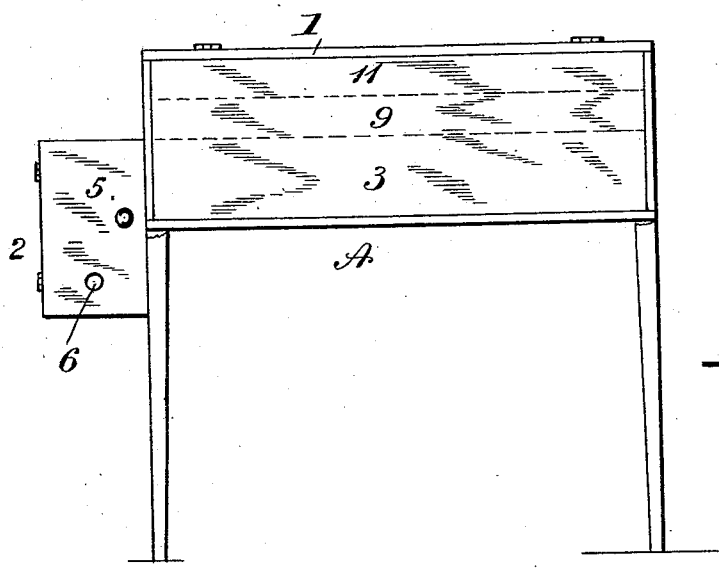
Figure 2:
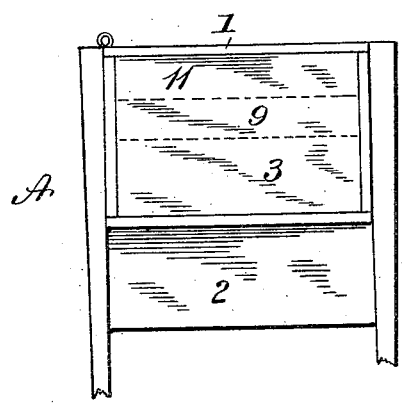
Figure 3:
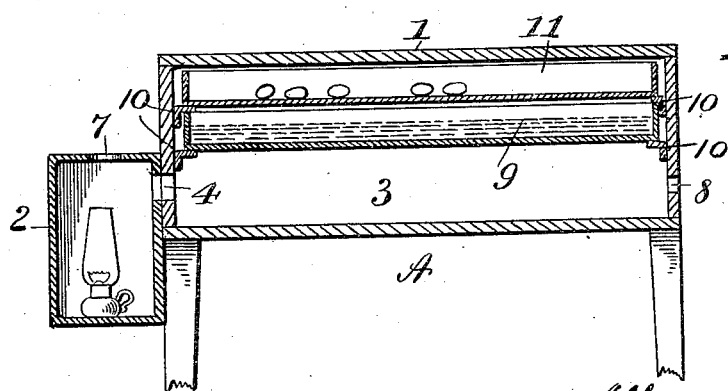

In the accompanying drawings Figure 1 is a view in front elevation, Fig. 2 is an end view and Fig. 3 is a longitudinal section.

A, represents the incubator and 1 the cover which is hinged at the top.

A receptacle or lamp chamber 2 is connected to one end of the incubator, and is connected to the heating drum 3, by an opening 4. The chamber is provided with a door 5, which is provided with an air inlet 6, and an outlet 7 is provided in the top of the chamber for the products of combustion. The drum 3 is provided with an air outlet 8 at the other end of the incubator, and received within the incubator and over the drum, is a water pan 9 which is supported therein by ledges 10, 10. Received over the water pan is the egg tray 11. The pan and tray are both deposited within the incubator through the top. The heat from the lamp will heat the water in the pan and the heat from the water keeps the eggs at the temperature desired. By the air vents the lamp receives a sufficient amount of air, and when the heat in the drum rises to a certain temperature, the products of combustion smother the lamp, reducing the flame and thus preventing it from giving the usual amount of heat, and thereby keeping the incubator at uniform temperature. If the lamp should burn out the heat in the drum and the heat of the water will keep the eggs warm for a number of hours.

It is evident that slight changes might be resorted to in the form and arrangement of the several parts described without departing from the spirit and scope of my invention, and hence I do not wish to limit myself to the exact construction herein set forth; but:—

Having fully described my invention, what I claim as new and desire to secure by Letters Patent, is:—

1. An incubator comprising a heating chamber, a drum connected therewith, an opening in the heating chamber coinciding with an opening in the drum for admitting the heat to the drum, a water pan supported over the drum and an egg tray supported over the water pan.

2. An incubator comprising a heating chamber, a drum connected therewith at one side, an opening connecting the heating chamber and drum for admitting the heat to the drum, an air inlet opening in the heating chamber and an outlet opening for the products of combustion, a water pan supported over the drum and an egg tray supported over the water pan.

ALBERT M. SHAUL.

Witnesses:
 E. C. COOK,
 LAWSON KING.